3,219,251
SEMI-AUTOMATIC SOLDER FEEDING
APPARATUS
Charles F. Davis, 6307 Agnes Ave., Los Angeles, Calif.
Filed Mar. 9, 1961, Ser. No. 94,577
2 Claims. (Cl. 228—53)

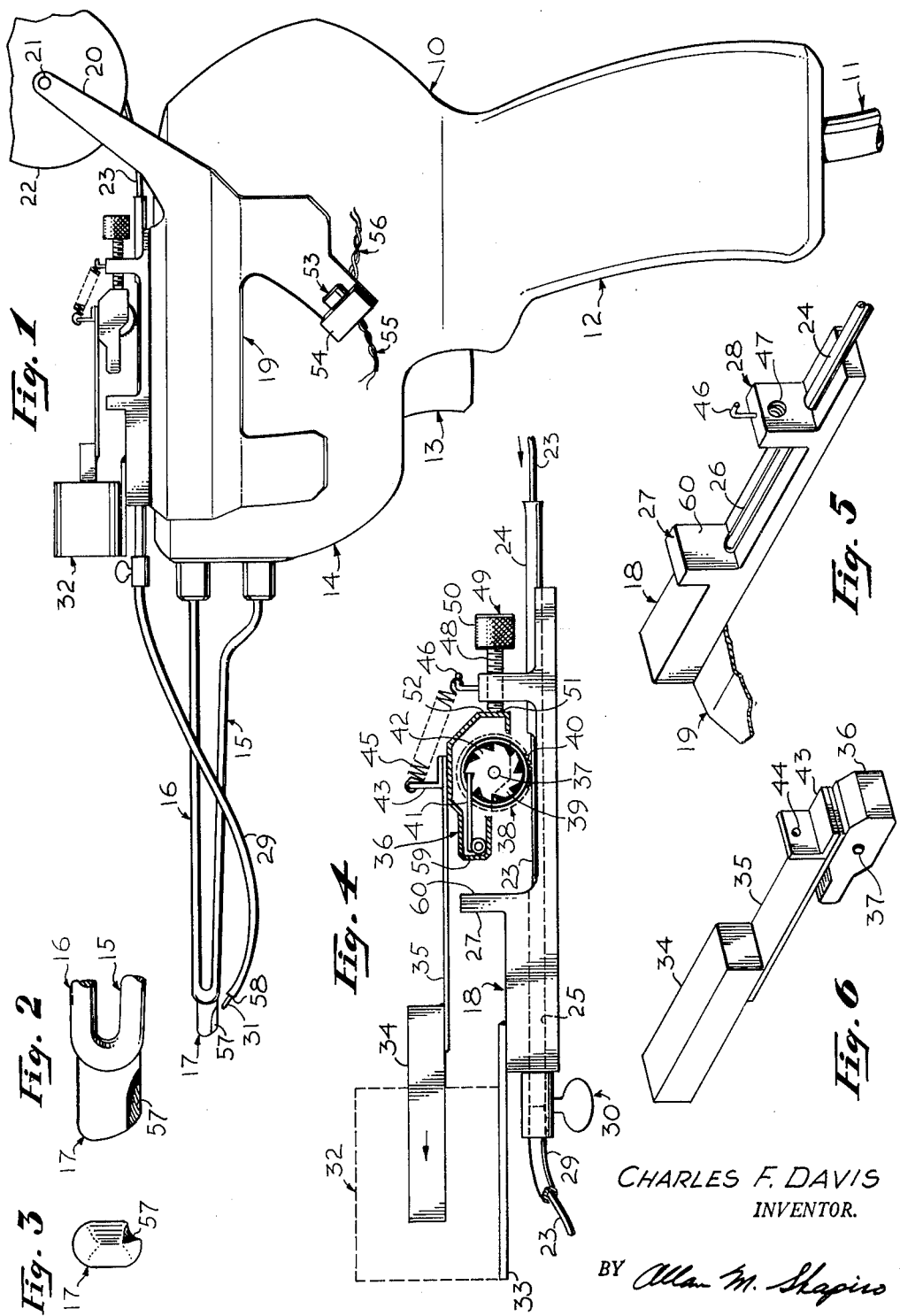
Nov. 23, 1965    C. F. DAVIS    3,219,251
SEMI-AUTOMATIC SOLDER FEEDING APPARATUS
Filed March 9, 1961
CHARLES F. DAVIS
INVENTOR.
BY Allan M. Shapiro
ATTORNEY United States Patent Office 3,219,251
Patented Nov. 23, 1965

The present invention relates to semi-automatic solder feeding apparatus and, more particularly, to such apparatus adapted for attachment to, or integrally incorporated with, a soldering gun or iron for selective operation in conjunction therewith.

As is well known to those skilled in the art, one of the most annoying difficulties in applying solder is the usual necessity for using one hand to operate the soldering gun or iron and the other hand to feed the solder to the soldering tip and/or object to be soldered. Obviously, when working in a confined space or when it is necessary to hold the soldered object at the same time, the operator is faced with a difficult problem of manipulation because of his inherent insufficiency of hands. In addition, manual feeding of solder is inaccurate in terms of both the quantity of solder fed in any particular "shot" and the location of the end of the solder wire with respect to the soldering tip or object.

Although there have been some attempts in the past to solve these problems, the devices of the prior art have been large, heavy, cumbersome, expensive, and subject to failure. Furthermore, such devices generally have failed either to properly locate the end of the solder wire as fed or to feed a selectively predetermined quantity of solder in accordance with the particular requirements of different types of soldering operations.

Therefore, it is one of the objects of the present invention to provide a semi-automatic solder feeding apparatus which may be attached to or integrally incorporated with a soldering gun and/or iron.

It is another object of the present invention to provide semi-automatic solder feeding apparatus which supplies a predetermined quantity of solder upon each actuation thereof.

Another object of the present invention is the provision of semi-automatic feeding apparatus with means for adjustably selecting a predetermined quantity of solder to be fed by a single actuation of the apparatus.

An additional object of the present invention is the provision of solder feeding apparatus with means for guiding the application of the solder to the desirable location in accordance with the best soldering practices.

Another object of the present invention is to provide solder feeding apparatus adapted for attachment to soldering guns of existing types without alteration or modification thereof whereby such guns may be converted to single-handed operation for the complete soldering function.

According to the present invention, a continuous supply of solder is fed through a guide tube having an opened channel portion through which access to the solder is attained for the forceful feeding thereof. Rotatable means are provided with means for engagement with the solder through such access portion. Rectilinearly operable means are provided for moving such rotatable means. A solenoid is secured to such rectilinearly operable means for actuation thereof. Means are provided for causing such rotatable engagement means to be locked when operated in a solder feeding direction and unlocked to permit freely rotatable return travel. The solenoid is actuated by manually operable means such as a push button switch coupled to the transformer which, in the case of a soldering gun, is usually already incorporated in the existing apparatus. Such switch preferably is located for thumb actuation but may be incorporated in the existing switch for operating power to the gun itself. Adjusting means, such as a screw in end abutment against the rectilinearly movable means, is externally accessible and controls the length of travel to provide a predetermined adjustment for the length of solder fed. The end of the solder-directing tube is adapted to be adjustably directed toward the location to which it is directed to feed the solder. The soldering tip of the gun is channeled in a preferred location to receive the solder.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, FIGURE 1 is a side elevation view of a soldering gun provided with semi-automatic solder feeding apparatus in accordance with the present invention;

FIGURE 2 is an enlarged fragmentary elevation view, similar in aspect to FIGURE 1, of the soldering tip of the device illustrated in FIGURE 1;

FIGURE 3 is an end elevation view of the soldering tip shown in FIGURE 2;

FIGURE 4 is an enlarged fragmentary elevation view, partly in section, of the solder feeding apparatus illustrated in FIGURE 1;

FIGURE 5 is an enlarged fragmentary perspective view of the mounting portion of the solder feeding apparatus illustrated in FIGURE 1; and FIGURE 6 is an enlarged perspective view of the rectilinearly operable portion of the solder feeding apparatus illustrated in FIGURE 1.

Referring to the drawings, there is seen one example of an electric soldering gun 10 of the usual construction and having a power cord 11 extending from the handle 12, a trigger 13 for actuating a power switch (not shown), a body portion 14 containing a transformer (not shown), and a pair of low resistance electrically conductive terminals 15 and 16 terminating in the soldering tip 17 which is heated in the well-known manner.

A mounting member 18 is provided with a resilient clamping member 19, which may be made of sheet metal welded to the mounting member 18, and adapted to be securely clamped about the body portion 14 of the soldering gun 10. The clamping member 19 is additionally provided with at least one upward extension portion 20 for rotatably supporting an axle 21 upon which a reel 22 of solder wire 23 is mounted. A rigid conduit 24 is press fitted into its receiving channel 25 in the mounting member 18 and is provided with a cutaway channel portion 26 between the upwardly extending block portions 27 and 28 of the mounting member 18, such channel portion 26 thereby exposing the solder wire 23 for access thereto by the solder actuation portions of the device as hereinafter described. A flexible conduit 29 is secured to the rigid conduit 24 in end abutting relationship thereto as by a clamp indicated generally at 30. The solder wire 23 is inserted through the rigid conduit 24 and the flexible conduit 29 so as to project a small portion 31 thereof out of the flexible conduit 29 and adjacent to the soldering tip 17.

A solenoid 32 is provided with a mounting plate 33 which is welded or otherwise secured to the mounting member 18. The armature or plunger 34 of the solenoid 32 is welded to an extension plate 35 for rectilinear movement thereof. A housing 36 is welded to the end of the extension plate 35 and supports an axle 37 upon which a wheel 38 and a ratchet 39 are rotatably mounted. Either the wheel 38 and ratchet 39 are secured to each other, as by welding, or the ratchet 39 may be formed from the body of the wheel 38 so as to be an integral part thereof, as desired, in order to assure common rotation of the wheel 38 and ratchet 39. The peripheral surface 40 of the wheel 38 is serrated or knurled to assure positive engagement between the surface 40 and the solder wire 23 in the operation of the device. A pawl 41 is mounted within the housing 36 so as to engage the teeth 42 of the ratchet 39 in the well-known ratching manner. A spring mounting block 43 is welded to the plunger extension plate 35 and is provided with an aperture 44 for receiving one end of a spring 45, the other end of which is looped about a hook 46 which is screwed into the extension block portion 28 of the mounting member 18. The spring 45 is maintained in tension at all times so as to tend to resiliently maintain the housing 36 in the retracted position illustrated and similarly maintain the plunger 34 in its outward position with respect to its solenoid 32. Also, the spring 45 exerts a downward force to aid in maintaining engagement of the wheel's surface 40 with the solder wire 23. The mounting extension block 28 has a threaded aperture 47 for receiving the threaded shank 48 of an adjusting bolt 49, the latter having a knurled head 50 for permitting manual adjustment of the amount of solder wire 23 fed during each actuation of the device as explained hereinafter in connection with the description of operation. The end 51 of the threaded shank 48 abuts against a flat surface 52 of the housing 36.

A button switch 53 is secured to an extension 54 of the clamp 19 and is provided with a pair of wire leads 55 which are connected to the coil (not shown) of the solenoid 32. The switch 53 is also provided with a pair of wire leads 56 which are connected to the transformer (not shown) of the soldering gun 10 so that power is available to the solenoid 32, through the switch 53, only when the gun itself has been actuated by means of the trigger switch actuator 13, thus preventing the accidental actuation of the solder feeding apparatus when the gun 10 is not performing its usual function.

The soldering tip 17 is provided with a channel or groove 57 extending longitudinally along a portion of the bottom region of the soldering tip 17. The conduit 29 is composed of a semi-rigid material, such as aluminum tubing, and may be manually flexed in a smooth continuous curve, without any sharp radii of curvature throughout its entire length, so as to avoid any contact with or proximity to the terminals 15 and 16. The end 58 of the conduit 29 is located relatively adjacent to the soldering tip 17 so as to direct the end portion 31 of the solder wire 23 at the groove 57 in the soldering tip 17. However, the conduit end 58 is maintained at a sufficient distance from the soldering tip 17 to prevent melting of the solder wire end portion 31 until such portion is driven forward into actual contact with the grooved portion 57 of the soldering tip 17, which occurs in accordance with the operation of the apparatus as hereinafter explained.

In operation, the operator grips the handle 12 of the gun 10 in the well-known manner and places his trigger finger upon the trigger 13 and his thumb upon the button switch 53. Obviously, the switch 53 is illustrated in the position for right-handed operation; for left-handed operation, the clamp extension 54 and switch 53 are located on the opposite side of the body portion 14 of the gun 10. Upon actuation of the trigger 13, the soldering tip 17 is heated and power is available at the button switch 53 from the transformer of the gun. When the soldering tip 17 reaches the appropriate temperature, the operator places the bottom region of the soldering tip 17 upon the work piece or pieces (not shown) to heat same to prevent the occurrence of a cold solder joint. Then, the operator depresses the thumb switch 53 to cause the solder feeding apparatus to function.

The electrical current passing through the coil of the solenoid 32 by means of the wire leads 55 causes the solenoid armature or plunger 34 to move to the left into the body of the solenoid 32. The plunger 34, extension plate 35, housing 36 and all of the elements within the housing 36 being fixed in their positions relative to each other, insofar as rectilinear movement is concerned, all such elements will similarly move to the left until the forward end surface 59 of the housing 36 abuts against the opposed surface 60 of the blocking member 27. All of such elements will remain in such forward position as long as the actuation of the solenoid 32 is maintained by depression of the thumb switch 53. During all of the just-described forward (to the left) movement, the ratchet wheel assembly has a tendency to rotate in a counter-clockwise direction because of the engagement of its surface 40 with the solder wire 23. However, such rotatable movement is prevented by the engagement of the pawl 41 with one of the ratchet teeth 42. As a consequence, the wheel surface 40 drives the solder wire 23 in a forward direction through its conduits 24 and 29 so that the solder end portion 31 is driven into the groove 57 of the soldering tip 17. The amount of solder so driven will immediately melt and be deposited upon the work. Upon release of the thumb switch 53, the housing 36 and all of the previously mentioned elements secured thereto are returned in the rearward direction (to the right) until the housing surface 52 abuts against the end surface 51 of the adjusting bolt 49, and are maintained in that rearward position by the tensed spring 45. During such rearward movement, the ratchet wheel assembly rotates freely upon its axle 37 and the wheel surface 40 rolls upon the solder wire 23. Thus, during rearward movement of the solder driving portion of the apparatus, the solder wire 23 remains stationary.

As is now obvious, the length of the solder wire 23 fed by the apparatus and, thus, supplied to the groove 57 of the soldering tip 17 is identical to the rectilinear length of travel of the ratchet wheel means. Hence, by turning the adjusting knob 49 so as to vary the initial distance between the housing end surface 59 and the blocking member surface 60 when the housing 36 is in its rearward position shown, the amount of solder wire 23 to be fed for each depression of the thumb switch 53 can be selectively predetermined.

It should be noted that, although a solenoid is preferred, any power-actuated means may be utilized for driving the housing 36 and the ratchet wheel assembly, and that the relative location of the driving means with respect to the housing and other portions of the apparatus may be varied in accordance with configurational requirements. For example, the solenoid 32 may be located rearwardly of the housing 36, the direction of the winding of the coil of the solenoid being reversed accordingly so that actuation thereof will cause the armature 34 to move in a forward direction. Similarly, the adjusting bolt 49 may be disposed through the blocking member 27 so that its end surface 51 will abut against the housing surface 59, and the block member 28 will act as a rearward stop for the housing 36.

It also should be noted that adjustment of the length of rectilinear movement of the ratchet wheel means may be accomplished by cooperative association of the adjusting bolt 49 or other stop means with any portion of the rectilinearly movable drive means, such as the plunger 34 of the solenoid 32.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. Apparatus for feeding solder to the tip of an electrical soldering device comprising: mounting means adapted to be secured to such soldering device; conduit means secured to said mounting means for receiving and guiding a wire of such solder therethrough to said soldering tip; an open channel portion in said conduit means for laterally exposing a portion of said solder; rotatable ratchet wheel means having a peripheral surface in engagement with said solder through said open channel portion; selectively actuatable drive means in rectilinearly movable relationship to said conduit means fixedly secured to said ratchet wheel means for causing selective alternating forward and rearward movement of said ratchet wheel means; said drive means including a solenoid having a rectilinearly reciprocable armature, said armature being effectively secured to said ratchet wheel means in driving relationship thereto; and pawl means fixedly secured to said drive means said pawl means being in ratching engagement with said ratchet wheel means for preventing rotation thereof during such forward movement and permitting rotation thereof during such rearward movement, whereby said ratchet wheel means drives said solder during such forward movement only.

2. Apparatus in accordance with claim 1 including a manually operable switch adapted to connect said solenoid with a source of power, said switch being located for actuation by the thumb of the operator during normal operation of the soldering device.

References Cited by the Examiner
UNITED STATES PATENTS

| | | | |
|---|---|---|---|
| 1,540,859 | 6/1925 | Plique | 113—109 |
| 2,125,781 | 8/1938 | Harris | 113—109 |
| 2,432,428 | 12/1947 | Lang | 113—109 |
| 2,454,875 | 11/1948 | Hyde | 219—27 XR |
| 2,480,057 | 8/1949 | Soreng et al. | 317—186 XR |
| 2,843,073 | 7/1958 | Voss et al. | 113—109 |
| 2,875,719 | 3/1959 | Smith | 113—109 |
| 2,901,585 | 8/1959 | Baccari | 113—109 XR |
| 2,952,232 | 9/1960 | Sipala | 113—109 |
| 2,976,464 | 3/1961 | Gopfert | 317—186 XR |
| 3,068,826 | 12/1962 | Meader et al. | 113—94 XR |
| 3,070,057 | 12/1962 | Dezzani | 113—109 XR |

CHARLES W. LANHAM, *Primary Examiner.*

WHITMORE A. WILTZ, JOHN F. CAMPBELL,
*Examiners.*